Feb. 21, 1939.  W. H. BASELT ET AL  2,148,366
BRAKE ARRANGEMENT
Filed Dec. 24, 1936  6 Sheets-Sheet 1

Inventors:
Walter H Baselt,
Ray G Aurien,
By Wilkinson, Huxley, Byron & Knight Attys

Feb. 21, 1939.   W. H. BASELT ET AL   2,148,366
BRAKE ARRANGEMENT
Filed Dec. 24, 1936   6 Sheets-Sheet 2

Inventors:
Walter H. Baselt,
Ray G. Aurien,

Patented Feb. 21, 1939

2,148,366

UNITED STATES PATENT OFFICE 2,148,366

BRAKE ARRANGEMENT

Walter H. Baselt and Ray G. Aurien, Chicago, Ill., assignors to American Steel Foundries, Chicago, Ill., a corporation of New Jersey Application December 24, 1936, Serial No. 117,664

28 Claims. (Cl. 188—46)

This invention pertains to brakes, and more particularly to unit cylinder clasp brakes for use with four or six-wheel motor trucks.

An object of the invention is to provide a clasp brake arrangement adapted particularly for use with motor trucks.

Another object is to provide a brake arrangement adapted for use with the end wheels of a six-wheel motor truck, and operable either manually or by a power cylinder.

Still another object is to provide a brake arrangement which is simple in design and application, inexpensive to make and maintain, and fulfills all requirements of manufacture and service.

A further object is to provide power operating means for a brake arrangement adjacent the end of a truck and operable inboard thereof to brake applied position.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

This application is a continuation-in-part of application Serial No. 708,777, filed January 29, 1934.

Referring first of all more particularly to the truck construction illustrated in Figures 1 to 5 inclusive, the six-wheel truck includes the side frame 20 provided with the end rails 22 and 24 connecting opposite side frames. Intermediate spaced transoms 26 are provided integral with the spaced side frames, the bolster 28 being disposed between said transoms, said bolster having a center bearing 30. The side frame 20 is provided with the spaced pedestal jaws 32 for receiving suitable journal means (not shown) and having cooperative engagement with the journal ends of the end wheel and axle assemblies 34 and 36 and the intermediate wheel and axle assembly 38. The end wheel and axle assemblies are provided with the motors 40 applied to each of said wheel and axle assemblies.

The end rail 22 is provided with the bracket 42 to which the hanger levers 44 are pivoted as at 46. The brake head 48 is pivotally mounted as at 50 to the hanger levers 44 intermediate the ends thereof, said brake head being provided with a suitable shoe adapted to have braking cooperation with the wheel and axle assembly 34, brake heads 48 on opposite sides of the truck being connected by the bar 51. The pull rods or straps 52 are pivoted to the lower end of the hanger levers as at 54 and are provided with the slack adjuster 56. The pull rods extend below the journal means and are pivoted adjacent the inner end thereof as at 58 to the lower end of the live truck lever 60.

The brake head 62, provided with a suitable brake shoe, is pivotally mounted as at 64 intermediate the ends of the live truck lever and is adapted to have braking cooperation with the wheel and axle assembly 34 on the periphery of the wheel at the inside thereof, the brake hangers 66 being pivoted to the brake head and pivoted as at 68 to the truck side frame. The upper end of the live brake lever is pivotally connected as at 70 to a suitable clevis 72 pivoted as at 74 to the inner end of the dead truck equalizer 76, said equalizer being pivoted intermediate the ends thereof as at 78 to the strap 80 which is pivotally connected as at 82 to the bracket 84 provided on the truck side frame.

The equalizer is slidably supported on the equalizer guide or bracket 86 provided on the truck frame and the outer end of said truck equalizer is pivotally connected as at 88 to the pull rod 90. The other end of the pull rod 90 is pivotally connected as at 92 to the outer end of the live truck equalizer 94 which is slidably supported on the equalizer guide or bracket 96 provided on the truck frame. The inner end of the live truck equalizer is pivotally connected as at 98 through a suitable clevis 100 to the upper end 102 of the live truck lever 104. The live truck lever is provided with the brake head 106 pivotally connected thereto as at 108 and having a suitable brake shoe adapted to have braking cooperation with the end wheel and axle assembly 36.

The brake hangers 110 are pivotally connected to the brake head and pivotally supported on a suitable bracket provided on the side frame as at 112. The lower end of the live truck lever 104 is provided with pull rods or straps 114 pivoted thereto as at 115, the outer ends of said pull rods being provided with the slack adjuster 116 and pivotally connected as at 118 to the lower end of the hanger levers 120. The hanger levers 120 are provided with the brake head 122 having a suitable brake shoe thereon for braking cooperation with the outer periphery of the wheel of the wheel and axle assembly 36, brake heads 122 on opposite sides of the truck being connected by the bar 123. The upper ends of the dead hanger levers are pivotally connected as at 124 to the inner bracket 126 provided on the truck side frame and the end rail 24.

The pull rod 128 is pivotally connected as at 130 to the live truck equalizer 94 intermediate the ends thereof, the pull rod being provided with the inner jaw 132 loosely connected to the outer end of the hand brake equalizer 134 provided inwardly of the wheel and axle assembly 36 and adjacent the transoms 26. The outer end of the pull rod 128 is pivotally connected as at 136 to the outer end of the diagonally disposed auxiliary or fulcrum lever 138, said lever being provided adjacent its outer end with the release spring 140 connected at one end to the auxiliary lever and at the opposite end to a bracket 142 provided on the side frame. The auxiliary lever is pivotally mounted intermediate the ends thereof as at 144 to the bracket 146 provided on the end rail. The inner end of the auxiliary lever 138 is pivotally connected as at 148 to the pull rod 150, a suitable bracket 152 being disposed on the end rail for supporting engagement with the auxiliary lever. The inner end of the pull rod 150 is pivotally connected as at 154 to the cylinder equalizing bar 156 which is slidably supported on the cylinder equalizing guides or brackets 158 provided on the end rail. The piston 160 of the operating cylinder 162 is pivotally connected as at 164 to the equalizing bar intermediate the ends thereof, the cylinder 162 being supported on the integral bracket 166 provided on the depressed end rail 24 in such a position that the brake cylinder is substantially at the level of the side frame.

Referring now more particularly to the truck construction illustrated in Figures 6 to 10 inclusive, the four-wheel truck includes the side frame 220 provided with the end rails 222 and 224. Intermediate spaced transoms 226 are provided integral with spaced side frames, a suitable bolster (not shown) being disposed between said transoms. The side frame 220 is provided with the spaced pedestal jaws 232 for receiving suitable journal means (not shown) having cooperative engagement with the journal ends of the wheel and axle assemblies 234 and 236. The wheel and axle assemblies are provided with motors 240 applied to each of the wheel and axle assemblies and occupying most of the space between the end rails and the transoms.

The end rail 222 is provided with the bracket 242 to which the hanger levers 244 are pivoted as at 246. The brake head 248 is pivotally mounted as at 250 to the hanger levers intermediate the ends thereof, said brake head being provided with a suitable brake shoe adapted to have braking cooperation with the wheel and axle assembly 234, brake heads 248 on opposite sides of the truck being connected by the tie bar 251. Pull rods or straps 252 are pivoted to the lower end of the truck lever as at 254 and are provided with the slack adjuster 256. The pull rods extend below the journal means and are pivoted adjacent the inner end thereof as at 258 to the lower end of the live truck lever 260.

The brake head 262, provided with a suitable brake shoe, is pivotally mounted as at 264 intermediate the ends of the live truck lever and is adapted to have braking cooperation with the wheel and axle assembly 234 on the periphery of the wheel at the inside thereof. Brake hangers 266 are pivoted to the brake head and pivoted as at 268 to the truck side frame. The upper end of the live truck lever is pivotally connected as at 270 to a suitable clevis 272 pivoted as at 274 to the inner end of the dead truck equalizer 276, said equalizer being pivoted intermediate the ends thereof as at 278 to the strap 280 which is pivotally connected as at 282 to the bracket 284 provided on the truck side frame. The equalizer is slidably supported on the equalizer guide or bracket 286 riveted on the truck side frame and the outer end of said truck equalizer is pivotally connected as at 288 to the pull rod 290. The other end of the pull rod 290 is pivotally connected as at 292 to the outer end of the live truck equalizer 294 which is slidably supported on the equalizer guide or bracket 296 riveted on the truck frame.

The inner end of the live truck equalizer is pivoted as at 298 through the clevis 300 to the upper end 302 of the live truck lever 304. The live truck lever is provided with the brake head 306 pivotally connected thereto as at 308 and having a suitable brake shoe adapted to have braking cooperation with the wheel and axle assembly 236. Brake hangers 310 are pivotally connected to the brake head and pivotally supported on a suitable bracket provided on the side frame as at 312. The lower end of the live truck lever 304 is provided with the pull rods or straps 314 pivoted thereto as at 315, the outer end of said pull rods being provided with the slack adjuster 316 and being pivotally connected as at 318 to the lower end of the hanger levers 320.

The hanger levers 320 are provided with the brake head 322 having a suitable brake shoe thereon for braking cooperation with the outer periphery of the wheel and axle assembly 236, said brake shoes on opposite sides of the truck being connected by tie bars 323. The upper ends of the hanger levers are pivotally connected as at 324 to the inner bracket 326 provided on the end rail 224. The pull rod 328 is pivotally connected as at 330 to the live truck equalizer 294 intermediate the ends thereof, the pull rod being provided with the intermediate jaw 332 loosely connected to the outer end of the hand brake equalizer 334 provided inwardly of the end rail 224. The outer end of the pull rod 328 is pivotally connected as at 336 to the outer end of the diagonally disposed auxiliary or fulcrum lever 338, said lever being provided adjacent its outer end with the release spring 340 connected at one end to the auxiliary lever and at the opposite end to the bracket 342 provided on the side frame.

The auxiliary lever is pivotally mounted intermediate the ends thereof as at 344 to the bracket 346 provided on the end rail. The inner end of the auxiliary lever 338 is pivotally connected as at 348 to the pull rod 350, a suitable bracket 352 being disposed on the end rail for supporting engagement with the auxiliary lever. The inner end of the pull rod 350 is pivotally connected as at 354 to the cylinder equalizing bar 356 which is slidably supported on the cylinder equalizing bar guides or brackets 358 provided on the end rail. The piston 360 of the operating cylinder 362 is pivotally connected as at 364 to the equalizing bar intermediate the ends thereof, the cylinder 362 being supported on the integral bracket 366 provided on the depressed end rail 324 in such a position that the top of the cylinder is substantially at a level with the side frame.

In operation of the brake rigging of these truck constructions, assuming the brakes to be in inoperative position, movement of the pistons toward the left as viewed in the figures moves the equalizing levers toward the left whereby the pull rods 150 and 350, respectively, move the auxiliary or fulcrum levers in a counter-clockwise direction about their respective pivots whereby the pull rods 128 and 328 move the live truck equalizers toward the right, causing the brake head of the brake shoes 106 and 306 to contact the wheel and axle assemblies 36 and 236. Simultaneously the live truck levers 104 and 304 pivot about the points 108 and 308, causing pull rods 114 and 314 to move the hanger levers 120 and 320 to brake applied position.

Movement of the live truck equalizers toward the right as viewed in the figures causes the pull rods 90 and 290 to move the dead truck equalizers 76 and 276 in a counter-clockwise direction whereby the live truck levers 60 and 260 apply the brake heads 62 and 262 to the wheel and axle assemblies 34 and 234. Simultaneously the live truck levers pivot about the points 64 and 264 in a counter-clockwise direction whereby the pull rods 52 and 252 move the hanger levers 44 and 244 to brake applied position. Release of the brake rigging by releasing pressure in the cylinders permits the springs 140 and 340 to operate the linkages in a reverse direction to brake applied position.

Referring now more particularly to the truck construction illustrated in Figures 11 to 14 inclusive, the truck frame 400 includes the side frames 402 integrally connected intermediate the ends thereof by the spaced transverse transom members 404 for accommodating the usual bolster (not shown) and connected adjacent the ends by the end rails 406 and 408. The side frames are provided with the spaced pedestals 410 for accommodating journal means (not shown) of the wheel and axle assemblies 412, and said journal means may have cooperating engagement with the equalizers 411. The brake rigging is substantially the same as that shown and described in Figures 6 to 10 inclusive.

In this modified construction the end rail 408 is provided with the outer bracket members 414 to which the end dead truck lever or dead hanger lever 416 is pivoted as at 418. The truck lever 416 is pivotally connected as at 420 to the brake head 422 provided with a suitable shoe for braking cooperation with the outer periphery of the adjacent wheel, the pivot 420 also serving to connect the dead truck levers 416 on opposite sides of the truck by means of the tie straps 424 which correspond to the tie straps 506 hereinafter referred to and shown in Figure 14 of the drawings. The lower end of the dead truck lever 416 is pivotally connected as at 426 to the manual slack adjuster 428 provided on the spaced straps 430. The inner ends of the straps 430 are pivotally and adjustably connected as at 432 to the lower end of the live truck lever 434 disposed in the plane of the adjacent wheel. The live truck lever 434 is pivotally connected as at 436 to the inner brake head 438 provided with a suitable shoe for braking cooperation with the inner periphery of the wheel 412.

The live truck lever 434 is likewise pivoted as at 436 to the spaced hangers 440, the upper ends of which are pivotally connected as at 442 to suitable brackets 444 provided on the truck frame, the outer of said hangers being provided with the wear plate 446 cooperating with the wear plate 447 on the guide bracket 448 provided on the truck frame adjacent the spring housing 449. This spring housing is adapted to receive the usual coil spring (not shown) disposed between the side frame and equalizers. The upper end of the live truck lever 434 extends through a slot 450 provided in the bracket 452 disposed between the adjacent transom and the side frame, the upper end of said truck lever being pivotally connected as at 454 to the clevis 456 which is pivotally connected as at 458 to the inner end of the dead horizontal truck equalizer lever 460. This equalizer lever is supported on a bracket 461 secured to the truck frame as at 463. The truck equalizer lever 460 is pivotally connected intermediate its ends as at 462 to the automatic slack adjuster 464.

The outer end of said equalizer member 460 is pivotally connected as at 466 to the pull rod 468, the other end of said pull rod being connected as at 470 to the outer end of the live truck equalizer lever 472. The inner end of said live equalizer lever is pivotally connected as at 474 to a clevis 476, said clevis being pivotally connected as at 478 to the upper end of the live truck lever 480. The upper end of said live truck lever extends through the slot 482 provided in the bracket 484 connecting the adjacent transom with the side frame. The live truck lever 480 is pivotally connected as at 483 to an inner brake head 485 having a suitable brake shoe adapted for breaking cooperation with the inner periphery of the adjacent wheel, and said live truck lever is also pivoted as at 483 to the hanger levers 484, the upper ends of said hanger levers being pivotally connected as at 486 to suitable brackets 488 provided on the truck frame.

As before, the outer brake hanger is provided with a wear piece 490 adapted to have sliding contact with a cooperating wear piece disposed on the side frame, these wear pieces being similar to the wear pieces 446 and 447. The lower end of the live truck lever 480 is pivotally and adjustably connected as at 492 to the spaced straps 494, the outer ends of said straps being pivotally connected as at 496, through the manual slack adjuster 498, to the lower end of the dead truck or hanger lever 500. The truck lever 500 is pivotally connected as at 502 intermediate the ends thereof to the brake head 504, said brake head being provided with a suitable shoe adapted to have braking cooperation with the outer periphery of the adjacent wheel. As before, the dead truck levers at opposite sides of the truck are connected by means of the tie strap 506 pivotally connected to the hanger levers at 502. The upper ends of the dead hanger levers 500 are pivotally connected as at 508 to suitable inner bracket members 510.

The live equalizer lever 472 is slidably supported on the bracket 512 provided on the truck frame and secured thereto as at 514. The live equalizer lever 472 is pivotally connected as at 516 intermediate the ends thereof to the pull rod 518, the outer end of said pull rod being pivotally connected as at 520 to the dead auxiliary or fulcrum lever 522. The fulcrum lever 522 slopes downwardly and inwardly, being supported on the bracket 524 and pivotally connected as at 526 to the bracket members 528 provided on the end rail 406.

The inner end of the fulcrum lever 522 is pivotally connected as at 528 to the pull rod 530 which extends inwardly of the truck frame and is pivotally connected as at 532 to one end of the cylinder equalizer 534, the opposite end of which is connected to a similar pull rod 530 pivoted to the brake rigging at the opposite side of the truck. The cylinder equalizer is slidably supported on the inwardly extending brackets 536 secured to the end rail 406 as at 538. The cylinder equalizer is pivotally connected as at 540 to the piston rod 542 of the operating cylinder 544, said cylinder being secured as at 546 to the bracket 548 provided on the end rail 406. The pull rod 518 is loosely connected as at 550 to the transverse hand brake equalizer bar 552 connected to suitable hand brake means, said equalizer being guided as at 554 by suitable bracket guides 556 provided on the side frame.

Figure 1:
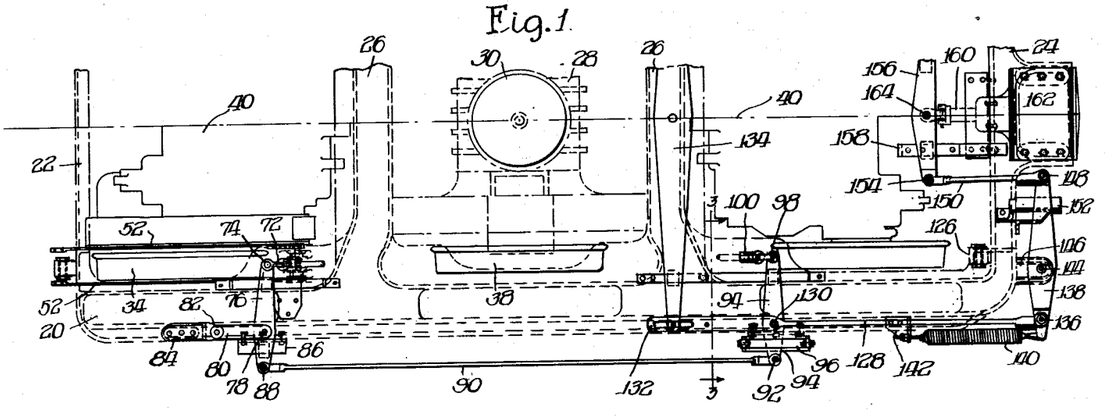
Figure 1 is a fragmentary top plan view of a six-wheel motor truck having brakes embodying the invention applied thereto.
Figure 2:
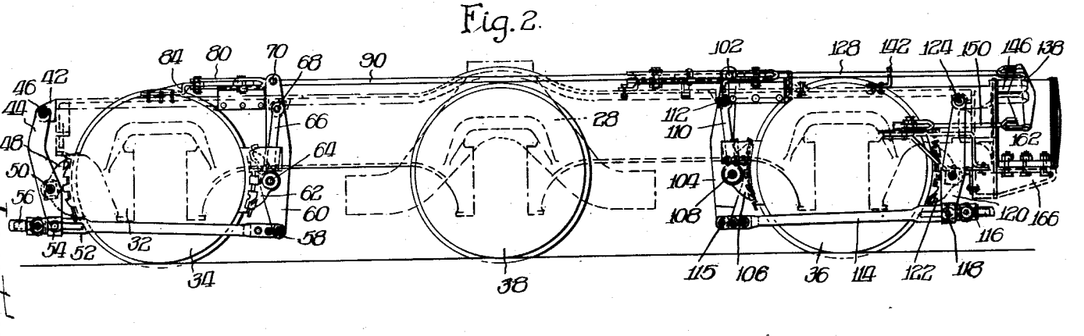
Figure 2 is a side elevation of the truck construction illustrated in Figure 1.
Figure 3:
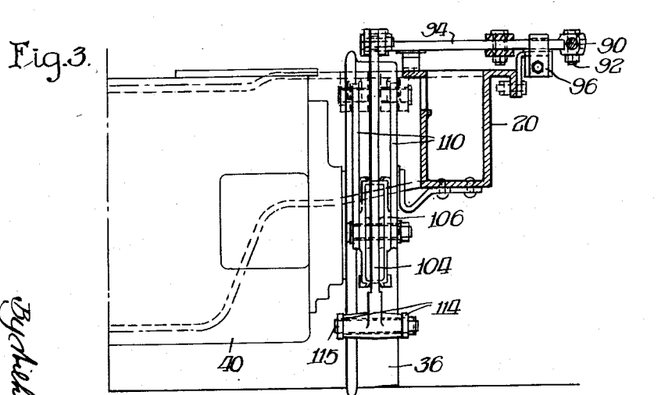
Figure 3 is a fragmentary transverse sectional elevation taken substantially in the plane as indicated by the line 3—3 of Figure 1.
Figure 4:
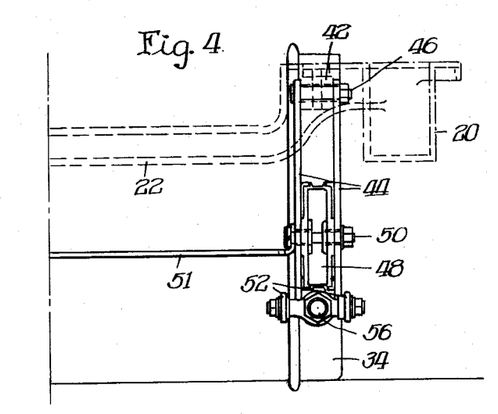
Figure 4 is a fragmentary end elevation of the truck construction embodying the invention, the same being taken substantially at the left end of the truck as illustrated in Figure 1.
Figure 5:
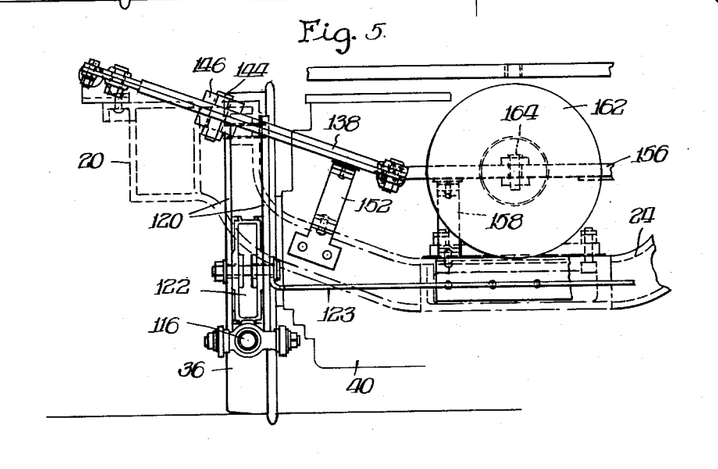
Figure 5 is a fragmentary end elevation of the truck construction embodying the invention, the same being taken substantially at the right end of the truck as illustrated in Figure 1.
Figure 6:
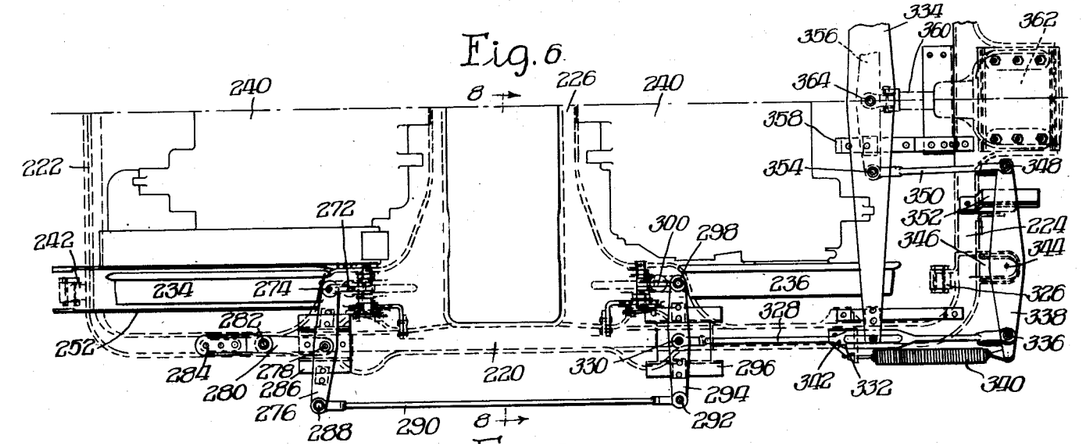
Figure 6 is a fragmentary top plan view of a four-wheel truck having applied thereto brakes embodying the invention.
Figure 7:
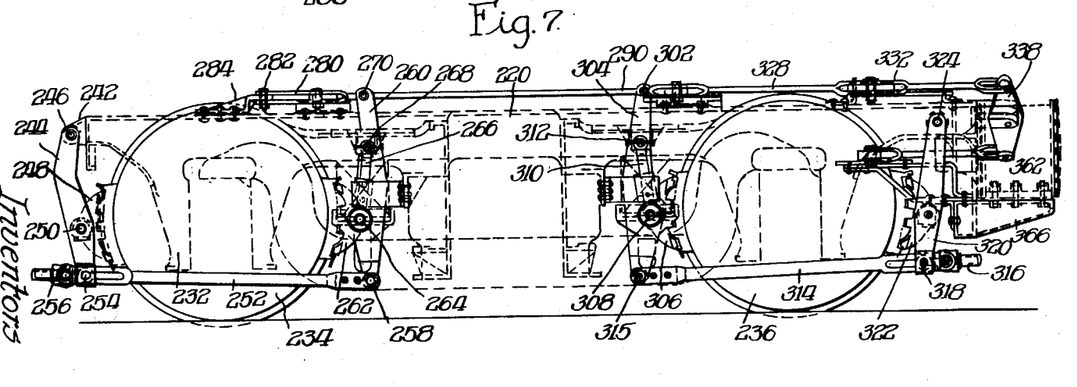
Figure 7 is a side elevation of the truck construction illustrated in Figure 6.
Figure 8:
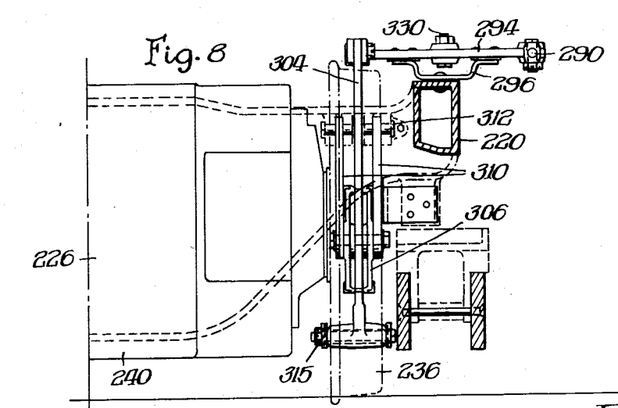
Figure 8 is a fragmentary transverse sectional elevation taken substantially in the plane of the transverse center line of the truck construction illustrated in Figure 6.
Figure 9:
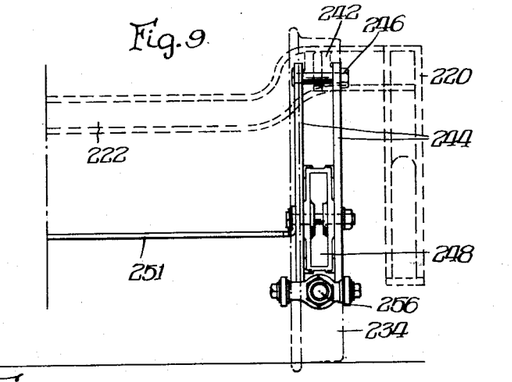
Figure 9 is a fragmentary end elevation of the truck construction embodying the invention, the same being taken substantially at the left end of the truck as illustrated in Figure 6.
Figure 10:
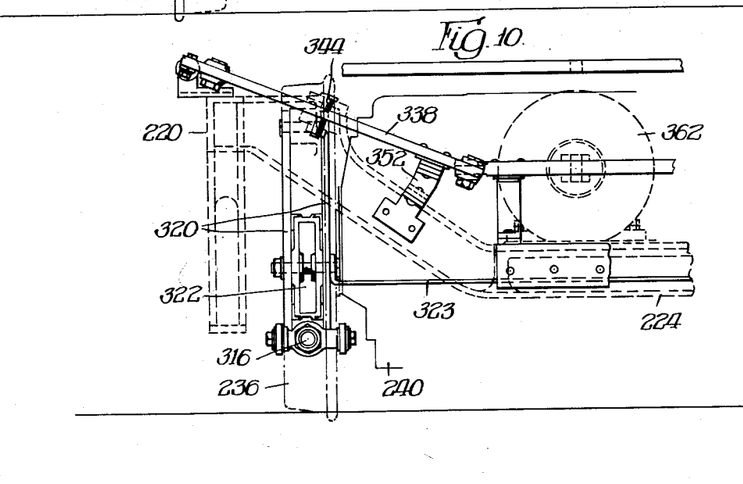
Figure 10 is a fragmentary transverse end elevation of the truck construction embodying the invention, the same being taken substantially at the right end of the truck as illustrated in Figure 6.
Figure 11:
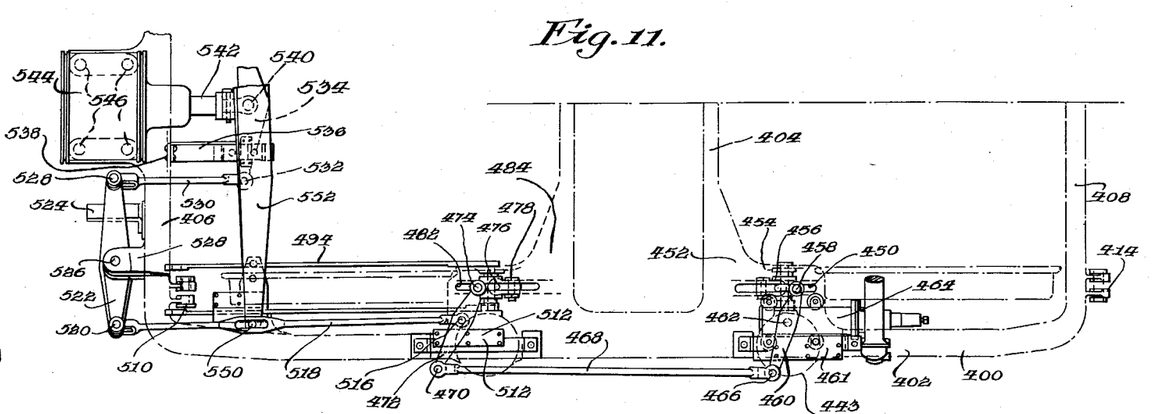
Figure 11 is a fragmentary top plan view of a truck construction having applied thereto a modified form of brake assembly embodying the invention.
Figure 12:
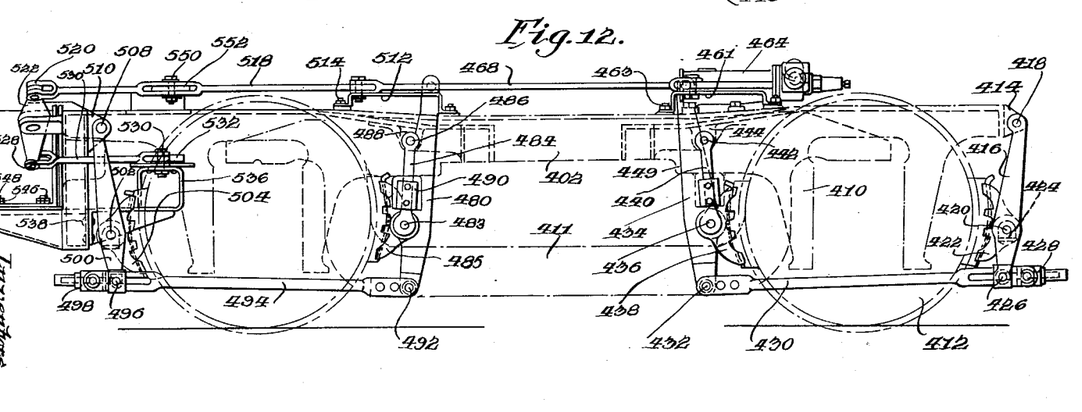
Figure 12 is a side elevation of the truck and brake construction illustrated in Figure 11.
Figure 13:
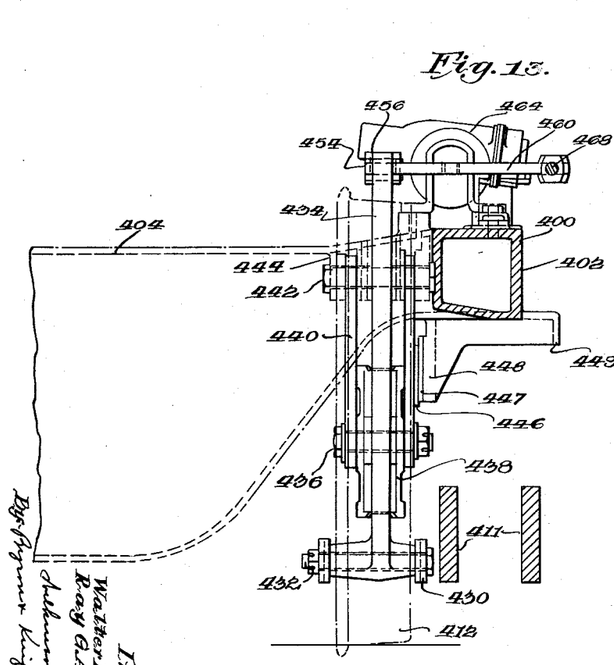
Figure 13 is a fragmentary transverse sectional elevation taken substantially in the plane of the transverse center line of the truck illustrated in Figure 11, looking toward the right as viewed in said figure.
Figure 14:
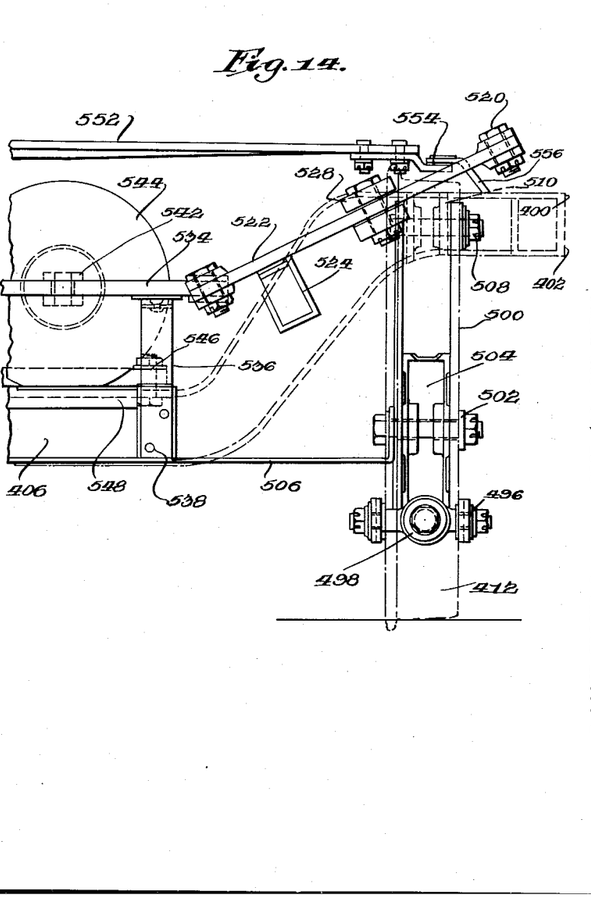
Figure 14 is a fragmentary transverse end elevation of the truck construction illustrated in Figure 11, the same looking toward the right as viewed in said figure.

The operation of this form of brake rigging is similar to that described with respect to Figures 6 to 10 inclusive, that is, assuming the brakes to be in inoperative position, movement of the piston 542 toward the right as viewed in Figures 11 and 12 moves the cylinder equalizing lever 534 toward the right, causing pull rod 530 to move the fulcrum lever 522 in a clockwise direction about the pivots 526 whereby the pull rod 518 moves the live truck equalizers 472 toward the left, causing the brake shoe of the head 484 to contact the periphery of the adjacent wheel. Simultaneously, the live truck lever 480 pivots about the point 482 to cause the straps 494 to move the dead truck lever 500 in a counterclockwise direction about the pivot 508 to thereby cause the brake shoe of the head 504 to have braking contact with the outer periphery of the adjacent wheel. Movement of the live equalizer lever 472 causes the pull rod 468 to move the dead equalizer lever 460 in a clockwise direction about the pivot 462 to thereby cause the upper end of the live truck lever 434 to be moved toward the right as viewed in Figures 11 and 12 to cause the brake shoe of the brake head 438 to have braking contact with the inner periphery of the adjacent wheel. The live truck lever 434 will pivot about the point 436, causing the straps 430 to move the dead truck levers 416 in a clockwise direction about the pivot 418, thus causing setting of the brake shoe of the brake head 422.

Operation of the brake system by the hand brake means through the equalizer bar 552 is in a similar manner, and release of the brake rigging, of course, is in an opposite direction to that described, it being understood that slack may be taken up through the manual slack adjusters 428 and 498, and slack is automatically taken up through the automatic slack adjuster 464.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a brake arrangement, the combination of a vehicle frame, a wheel associated therewith, live and dead truck levers disposed on opposite sides of said wheel and provided with brake shoes adapted to be applied to said wheel for braking operation thereof, a live equalizing lever directly connected to one of said truck levers, a connection between said truck levers, a dead auxiliary lever pivoted to said frame and directly connected to said live equalizing lever, and means connected to said auxiliary lever and operable in a direction toward said wheel and axle assembly for operating said auxiliary lever for brake application.

2. In a brake arrangement, the combination of a vehicle frame, a wheel associated therewith, live and dead truck levers disposed on opposite sides of said wheel and provided with brake shoes adapted to be applied to said wheel for braking operation thereof, an equalizing lever directly connected to said live truck lever, a connection between said truck levers, a dead auxiliary lever pivoted to said frame and directly connected to said equalizing lever, and means connected to said auxiliary lever and operable in a direction toward said wheel and axle assembly for operating said auxiliary lever for brake application.

3. In a brake arrangement, the combination of a six-wheel truck having a side frame and end members connected thereto, truck levers on each side of each of the end wheels, the inner of said levers being live levers, an equalizer lever connected directly to each of said live truck levers, said equalizer levers being connected to each other, an auxiliary lever fulcrumed intermediate the ends thereof to said truck adjacent the end thereof, a pull rod directly connecting one end of said auxiliary lever to one of said equalizer levers, and an operating cylinder supported by one of said end members and having a piston for operating said auxiliary lever.

4. In a brake arrangement, the combination of a six-wheel truck having a side frame and end members connected thereto, truck levers on each side of each of the end wheels, the inner of said levers being live levers, an equalizer lever connected directly to each of said live truck levers, said equalizer levers being directly connected to each other, an auxiliary lever fulcrumed intermediate the ends thereof to said truck adjacent the end thereof, a pull rod connecting one end of said auxiliary lever to one of said equalizer levers, and an operating cylinder supported by one of said end members and having a piston operable in a direction inboard of said truck for actuating the other end of said auxiliary lever.

5. In a brake arrangement, the combination of a six-wheel truck having a side frame and end members connected thereto, truck levers on each side of each of the end wheels, the inner of said levers being live levers, an equalizer lever connected directly to each of said live truck levers, said equalizer levers being directly connected to each other, an auxiliary lever fulcrumed intermediate the ends thereof to said truck adjacent the end thereof, a pull rod directly connecting one end of said auxiliary lever to one of said equalizer levers, an equalizer bar supported on one of said end members and inboard of said truck and connected to the other end of said auxiliary lever, and an operating cylinder supported on said last named end member and outwardly of said truck and having a piston connected to said equalizer bar.

6. In a brake arrangement, the combination of a four-wheel truck, truck levers on each side of each of the wheels, the inner of said levers being live levers, an equalizer lever connected directly to each of said live levers, said equalizer levers being connected to each other, one of said equalizer levers being a live lever, an auxiliary lever pivotally mounted intermediate the ends thereof to said truck and pivotally and directly connected adjacent one end thereof with said live equalizer lever, and operating means operable inboard of said truck for operating the other end of said auxiliary lever.

7. In a brake arrangement, the combination of a truck having a side frame and end members connected thereto, truck levers on each side of certain of the wheels, the inner of said levers being live levers, an equalizer lever connected directly to each of said live levers, one of said equalizer levers being a dead lever, the other being a live lever, a pull rod directly connecting said equalizer levers, an auxiliary lever pivotally mounted intermediate the ends thereof to one of said end members and connected at one end thereof by a pull rod to said live equalizer lever intermediate the ends of said live equalizer lever, and means operable inboard of said truck and supported by said last named end member for operating the other end of said auxiliary lever.

8. In a brake arrangement, the combination of a truck having a side frame and end members connected thereto, truck levers on each side of certain of the wheels, the inner of said levers being live levers, an equalizer lever connected to each of said live levers, one of said equalizer levers being a dead lever, the other being a live lever, a pull rod connecting said equalizer levers, an auxiliary lever pivotally mounted intermediate the ends thereof to one of said end members and connected at one end thereof by a pull rod to said live equalizer lever intermediate the ends of said live equalizer lever, means operable inboard of said truck and supported by said last named end member for operating the other end of said auxiliary lever, and auxiliary operating means connected to said last named pull rod intermediate the ends thereof.

9. In a brake arrangement, the combination of a truck having a side frame and an end connecting member, a wheel associated with said side frame, a brake arrangement associated with said wheel, means for operating said brake arrangement, said means including interconnecting equalizer levers directly connected to said brake arrangement, said means further including an auxiliary lever pivotally connected intermediate the ends thereof to said end member and pivotally and directly connected at one end thereof to one of the equalizers of said brake arrangement above the wheel center and outboard of said wheel, and means connected to the other end of said auxiliary lever and operable inboard of said truck for operating said auxiliary lever.

10. In a brake arrangement, the combination of a truck having a side frame and an end connecting member, a wheel associated with said side frame, a brake arrangement associated with said wheel, means for operating said brake arrangement, said means including a transversely disposed auxiliary lever pivotally connected intermediate the ends thereof to said end member and pivotally connected at one end thereof to said brake arrangement outboard of said wheel, means connected to the other end of said auxiliary lever and operable inboard of said truck for operating said auxiliary lever, and auxiliary means connected intermediate said brake arrangement and said auxiliary lever for operating said brake arrangement.

11. In a brake arrangement, the combination of a truck including a side frame and an end connecting member, a wheel associated with said truck, a brake arrangement associated with said wheel, operating means for said brake arrangement, said means including interconnected equalizer levers directly connected to said brake arrangement, said operating means further including a transversely disposed auxiliary lever pivotally and directly connected to one of the equalizers of said brake arrangement outboard of said wheel and pivotally mounted on said end connecting member, an operating cylinder supported by said end connecting member, an equalizing lever supported on said end connecting member inboard of said truck and operably connected to the piston of said cylinder, and a connection between said equalizing lever and said auxiliary lever.

12. In a brake arrangement, the combination of a truck having a side frame and an end connecting member, a wheel associated with said truck, a brake arrangement associated with said wheel including a live truck lever, operating means for said brake arrangement including an equalizer lever directly connected to said truck lever, said operating means further including an auxiliary lever pivotally mounted intermediate the ends thereof to said end connecting member and outboard of said truck and pivotally and directly connected adjacent the outer end thereof to the auxiliary lever of said brake arrangement, release means associated with the outer end of said auxiliary lever, an operating cylinder supported on said end member inwardly of said side frame, an equalizing lever slidably supported on said end member inboard of said truck, the piston of said cylinder being operably connected to said equalizing lever, one end of said equalizing lever being pivotally connected to the inner end of said auxiliary lever.

13. In a brake arrangement, the combination of a vehicle frame, a wheel associated therewith, a truck lever supported on said frame and provided with a brake shoe adapted to be applied to said wheel for braking operation thereof, an equalizing lever directly connected to said truck lever, a fulcrum lever pivotally mounted outward of said frame and directly connected to said equalizing lever, means for operating said fulcrum lever for brake application, said means being operable in a direction inboard of the frame, and means between said fulcrum and equalizing levers for moving said shoe away from said wheel upon release of said first named means.

14. In a brake arrangement, the combination of a truck frame, a wheel and axle assembly disposed in supporting relation to said frame, a truck lever disposed adjacent a wheel of said wheel and axle assembly, fulcrum means pivoted intermediate the ends thereof to said frame and directly connected adjacent the outer end thereof to said truck lever, a live equalizer bar slidably supported on said frame and operatively connected adjacent one end thereof to the inner end of said fulcrum means, and operating means directly connected to said equalizer bar intermediate the ends thereof.

15. In a brake arrangement, the combination of a truck frame, a wheel and axle assembly disposed in supporting relation to said frame, a truck lever disposed adjacent the wheel of said wheel and axle assembly, an equalizer lever directly connected at its end to said truck lever, a fulcrum lever pivoted intermediate the ends thereof to said frame and directly connected adjacent the outer end thereof to said equalizer lever, a live equalizer bar slidably supported on said frame and operatively connected adjacent one end thereof to the inner end of said fulcrum lever, and an operating cylinder supported on said truck frame outwardly of the end thereof and substantially on the longitudinal center line thereof, the piston of said cylinder being connected to the equalizer bar intermediate the ends thereof and operating in an inboard direction.

16. In a brake arrangement, the combination of a truck frame, wheels disposed in supporting relation to said truck frame, dead levers at the outside of said wheels, live levers at the inside of said wheels, connecting straps between said live and dead levers, interconnected equalizer levers directly connected to said live levers, fulcrum levers pivotally mounted on said truck frame intermediate the ends thereof, the outer ends of said fulcrum levers being directly connected to certain of said equalizer levers, an equalizer having opposite ends connected to the inner ends of said fulcrum levers, and operating means mounted on said frame and associated with said equalizer for operation thereof.

17. In a brake arrangement, the combination of a truck frame, a wheel disposed in supporting relation to said frame, a live lever at the inside of said wheel, a dead lever at the outside of said wheel, straps pivotally connecting the lower ends of said live and dead levers, an equalizer lever directly connected to said live lever, a fulcrum lever pivotally mounted at a point intermediate the ends thereof on said truck frame, one end of said fulcrum lever being directly connected to said live lever, an equalizer connected to the other end of said fulcrum lever, and operating means mounted on said frame and connected to said equalizer.

18. In a brake arrangement, the combination of a truck frame, wheels disposed in supporting relation to said truck frame, dead levers at the outside of said wheels, live levers at the inside of said wheels, connecting straps between said live and dead levers, interconnected equalizer levers directly connected to said live levers, fulcrum levers pivotally mounted on said truck frame intermediate the ends thereof, the outer ends of said fulcrum levers being directly connected to certain of said equalizer levers, an equalizer having opposite ends connected to the inner ends of said fulcrum levers, and operating means mounted on said frame and associated with said equalizer for operation thereof at substantially the center thereof.

19. In a brake arrangement, the combination of a six-wheel truck having a frame, wheels disposed in supporting relation to said frame, live levers at the insides of the end wheels, dead levers at the outsides of the end wheels, straps pivotally connecting the lower ends of said live and dead levers, equalizer levers directly to said live levers and being directly connected together, fulcrum levers mounted on said truck frame at points intermediate the ends thereof, the outer ends of said fulcrum levers being pivotally connected to certain of said equalizer levers, an equalizer having opposite ends connected to the inner ends of said fulcrum levers, and operating means connected to said equalizer.

20. In a brake arrangement, the combination of a six-wheel truck having a frame, wheels disposed in supporting relation to said frame, brake operating means, fulcrum levers mounted on said truck frame outwardly of said operating means, live levers at the insides of the end wheels, dead levers at the outsides of the end wheels, strap connections between the lower ends of said live and dead levers, equalizer levers directly to said live levers and being directly connected together, the outer ends of said fulcrum levers being pivotally connected to certain of said equalizer levers, an equalizer having the ends thereof connected to the inner ends of said fulcrum levers, and power means mounted on said frame and operatively connected to said equalizer.

21. In a brake arrangement, the combination of a six-wheel truck having a frame, wheels disposed in supporting relation to said truck frame, dead levers on one side of the end wheels, live levers on the opposite side of the end wheels, connecting straps between said live and dead levers, equalizer levers directly to said live levers and being directly connected together, fulcrum levers pivotally mounted on said truck frame at points intermediate the ends thereof, the outer ends of said fulcrum levers being directly connected to certain of said equalizer levers, an equalizer connected to the inner ends of said fulcrum levers at the opposite ends of said equalizer, and operating means mounted on said frame and operatively connected to said equalizer.

22. In a brake arrangement, the combination of a truck frame, a wheel and axle assembly disposed in supporting relation to said frame, a truck lever disposed adjacent a wheel of said wheel and axle assembly, fulcrum means pivoted intermediate the ends thereof to said frame and operatively connected adjacent the outer end thereof to said truck lever, a live equalizer bar slidably supported on said frame and operatively connected adjacent one end thereof to the inner end of said fulcrum means, operating means connected to said equalizer bar intermediate the ends thereof, and operating means operatively connected to said truck lever intermediate said fulcrum means and said truck lever.

23. In a brake arrangement, the combination of a truck frame, a wheel and axle assembly disposed in supporting relation to said frame, a truck lever disposed adjacent each wheel of said wheel and axle assembly, equalizers directly connected to said truck levers, transversely extending fulcrum means pivoted to said frame and directly connected adjacent the outer ends thereof to said equalizers, an equalizer bar connected to the inner ends of said fulcrum means, and operating means connected to said equalizer bar.

24. In a brake arrangement, the combination of a truck frame, a wheel and axle assembly disposed in supporting relation to said frame, a truck lever disposed adjacent each wheel of said wheel and axle assembly, equalizers directly connected to said truck levers, transversely extending fulcrum means pivoted to said frame and directly connected adjacent the outer ends thereof to said equalizers, an equalizer bar connected to the inner ends of said fulcrum means, and an operating cylinder supported on said frame, the piston of said cylinder being connected to said equalizer bar.

25. In a brake arrangement, the combination of a four-wheel truck, truck levers on each side of each of the wheels, the inner of said levers being live levers, an equalizer lever connected to each of said live levers, said equalizer levers being connected to each other, one of said equalizer levers being a live lever, an automatic slack adjuster pivoted to the other of said equalizer levers, an auxiliary lever pivotally mounted intermediate the ends thereof to said truck and pivotally connected adjacent one end thereof with said live equalizer lever, and operating means operable inboard of said truck for operating the other end of said auxiliary lever.

26. In a brake arrangement, the combination of a truck having a side frame and end members connected thereto, truck levers on each side of certain of the wheels, the inner of said levers being live levers, an equalizer lever connected to each of said live levers, one of said equalizer levers being a dead lever, the other being a live lever, an automatic slack adjuster pivoted to said last named dead lever, a pull rod connecting said equalizer levers, an auxiliary lever pivotally mounted intermediate the ends thereof to one of said end members and connected at one end thereof by a pull rod to said live equalizer lever intermediate the ends of said live equalizer lever, and means operable inboard of said truck and supported by said last named end member for operating the other end of said auxiliary lever.

27. In a brake arrangement, the combination of a truck having a side frame and end members connected thereto, truck levers on each side of certain of the wheels, the inner of said levers being live levers, an equalizer lever connected to each of said live levers, one of said equalizer levers being a dead lever, the other being a live lever, an automatic slack adjuster pivoted to said last named dead lever, a pull rod connecting said equalizer levers, an auxiliary lever pivotally mounted intermediate the ends thereof to one of said end members and connected at one end thereof by a pull rod to said live equalizer lever intermediate the ends of said live equalizer lever, means operable inboard of said truck and supported by said last named end member for operating the other end of said auxiliary lever, and auxiliary operating means connected to said last named pull rod intermediate the ends thereof.

28. In a brake arrangement, the combination of a truck frame, a wheel disposed in supporting relation to said frame, a live lever at the inside of said wheel, a dead lever at the outside of said wheel, straps pivotally connecting the lower ends of said live and dead levers, an automatic slack adjuster, a fulcrum lever pivotally mounted at a point intermediate the ends thereof on said slack adjuster, one end of said fulcrum lever being connected to said live lever, an equalizer connected to the other end of said fulcrum lever, and operating means mounted on said frame and connected to said equalizer.

WALTER H. BASELT.
RAY G. AURIEN.